United States Patent

[11] 3,612,222

| [72] | Inventor | Ray C. Minor<br>Abingdon, Va. |
|---|---|---|
| [21] | Appl. No. | 12,359 |
| [22] | Filed | Feb. 18, 1970 |
| [45] | Patented | Oct. 12, 1971 |
| [73] | Assignee | Kearney-National Inc.<br>New York, N.Y. |

[54] POLE DAMPING SYSTEM
4 Claims, 5 Drawing Figs.

[52] U.S. Cl. .................................................. 188/1 B,
 188/268
[51] Int. Cl. .................................................. F16f 7/10
[50] Field of Search ........................................ 188/1 B,
 268

[56] References Cited
UNITED STATES PATENTS

| 2,195,041 | 3/1940 | Von Schlippe | 188/1 B X |
|---|---|---|---|
| 2,699,696 | 1/1955 | Hahn | 188/1 B X |
| 2,714,161 | 7/1955 | Featherstun | 188/1 B |
| 3,174,589 | 3/1965 | Chen | 188/1 B X |

FOREIGN PATENTS

| 920,586 | 3/1963 | Great Britain | 188/1 B |

Primary Examiner—Duane A. Reger
Attorney—Mason, Fenwick & Lawrence

ABSTRACT: A pole damping system in which a hollow tubular member is attached to the wall of a hollow pole with an inertia mass in the form of a solid rod on the interior of the tube but unattached to the tube for limited movement on the interior of the tube for damping vibrations of the pole; in one embodiment the tubular member is mounted on the exterior of the pole but is mounted on the interior of the pole in another embodiment.

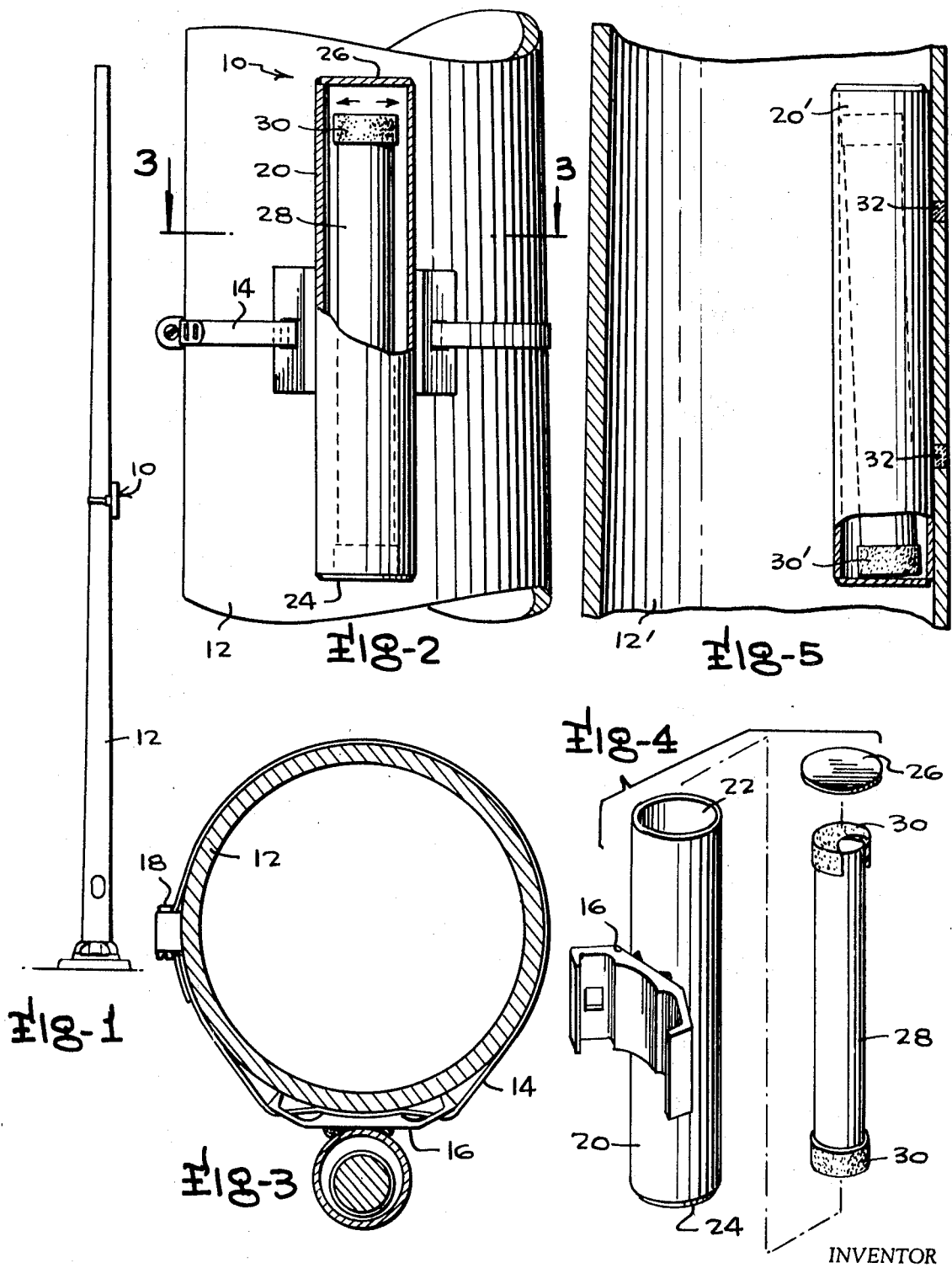

3,612,222

POLE DAMPING SYSTEM

BACKGROUND OF THE INVENTION

This invention is in the field of vibration damping means and is specifically directed to damping means for quelling the vibrations of an elongated polelike member such as a light pole, flagpole, traffic signal, supporting pole or the like.

Internal vibrations of poles supporting luminaries and the like which are created by environmental forces on such poles have caused many instances of mechanical failure of the pole and/or the luminaire or other item supported by the pole. For example, such vibrations frequently result in eventual pole failure of tubular metal poles due to metal fatigue which eventually results in complete breakage of the pole. Moreover, internal vibrations of this type frequently result in mechanical damage to the luminaire and its associated structure supported on the poles. For example, fittings and couplings may be eventually loosened by the vibration and the electrical components of the luminaire may also be damaged to such an extent as to become inoperative.

Generally speaking, the internal vibrations of support poles of this type are created by two primary sources. Probably the most common vibrational problems are created by wind flow over the pole which causes initial movement of the pole and generates a maximum oscillatory force at critical wind velocities determined by the geometry of the pole and the luminaire or the like supported on the pole. Contrary to general opinion, oscillatory vibration does not necessarily increase with wind velocity and a long-lasting wind at a low velocity providing maximum oscillatory effect on a particular pole can be much more damaging than would be a higher wind velocity. Additionally, other vibrations are created by the mechanical transfer of motion to the pole by the movement of traffic adjacent the pole location. This problem is most critical on bridges and the like in which the vibrations are directly transferred from the structural elements of the bridge to the pole member which is normally supported on the bridge.

Numerous approaches have been taken in an effort to overcome wind induced vibrations of pole members and the like and have met with varying degrees of success. For example, it has sometimes been necessary to use cables for tying adjacent poles together with the cables attached to the poles at the points of maximum amplitude vibration of the poles. In other instances, it has been necessary to redesign pole structures to provide for different resonant frequencies which would not be created by the prevailing wind characteristics at the pole location.

However, the principle approach in attempting to lessen wind induced vibrations has been through the employment of a damping device attached to the pole. Such devices have usually been in the form of an inertia mass connected to the pole by means of springs, pivots or the like so that vibrational movement of the pole is not instantaneously conveyed to the damping means. However, the prior known devices of this type such as those illustrated in U.S. Pat. No. 3,259,212 have been complicated and in many instances unusually cumbersome and costly. Consequently, such devices have not been capable of being employed in many locations and have failed to solve the problems of wind induced pole vibrations.

Certain characteristics have long been recognized as being desirable in pole damping means. For example, it is desirable that a damping means be of small size so as to be capable of being installed on a wide variety of pole sizes. Moreover, such means should be easily adjustable for varying the frequency characteristics in accordance with the nature of the pole with which it is being employed. An additional desirable feature of damping means is that such should be easily installed on present locations with a minimum of cost and effort. Additionally, in some locations it is desirable that the damping means be hidden so as not to Mar. the esthetic qualities of the particular pole construction. Prior to the present invention, none of the prior known damping devices have provided means capable of meeting all of these requirements.

SUMMARY OF THE INVENTION

It is the primary object of this invention to provide new and improved pole damping means.

Obtainment of the object of this invention is enabled through the provision of a damping means in the form of an elongated tubular member that is hollow on its interior to provide a closed chamber with a substantially high mass rod member mounted on the interior of the closed chamber. The closed chamber is of cylindrical configuration and the rod member is also of cylindrical configuration with a fairly small amount of clearance being provided between the wall of the chamber and the exterior of the rod. Consequently, the rod is free to make limited movement and serves to dampen movement of the tubular member in which it is supported. The tubular member is connected to a pole member either on the exterior of the pole or on the interior of the pole in accordance with the particular requirements of the pole installation. Additionally, plastic caps are fitted over the rod member to lessen the noise occasioned by the vibration of the tubular member with respect to the rod and vice versa.

The subject invention is easily installed either on the exterior or interior of the pole and has been found to provide greatly enhanced vibration reducing characteristics. While the exact reasons for the great vibration damping qualities of the subject invention are not fully understood, it is thought that the relative small amount of clearance between the tubular member and the rod member which limits the movement of the rod and the fact that the rod is completely unconnected to the tubular member in any manner serve to enhance the damping characteristics of the device.

Not only does the subject invention provide greatly enhanced damping characteristics, it is also much more economical to manufacture and assemble than are any of the prior known devices of the same purpose. Moreover, it is a simple matter to vary the damping characteristics of the subject invention by employing rods having different weight characteristics.

DESCRIPTION OF THE DRAWINGS

FIG. 1 is a side elevational view of the pole to which a preferred embodiment of the invention is attached;

FIG. 2 is an enlarged elevational view of the preferred embodiment attached to the exterior of the pole of FIG. 1;

FIG. 3 is a sectional view taken along lines 3—3 of FIG. 2;

FIG. 4 is an exploded perspective view illustrating the component parts of the embodiment illustrated in FIGS. 1 and 3; and FIG. 5 is a sectional view of a pole illustrating a second embodiment of the invention mounted on the interior wall of a tubular pole.

DESCRIPTION OF THE PREFERRED EMBODIMENTS

Attention is initially invited to FIG. 1 of the drawing which illustrates a first embodiment of the invention, generally designated 10, that is attached to the outer wall of a metal pole 12 for damping vibrations of the pole. Pole 12 is of hollow tubular design tapering gradually from top to bottom as shown in FIG. 1. However, it should be understood that the invention is not limited to use with either hollow, solid, or tapered poles and is capable of damping vibrations of a wide variety of items.

The damping means includes attaching means in the form of a conventional flexible steel belt or tape 14 which extends about the outer periphery of pole 12 and extends through an aligning bracket 16 as best shown in FIG. 3. The flexible steel belt 14 is tightened by a screw means 18, etc., in a conventional manner for pulling the aligning bracket 16 inwardly against the exterior of the pole 12.

An elongated tubular member 20 is welded to the outer side of aligning bracket 16. Member 20 defines an enclosed chamber 22 on its interior which is bound on its lower end by a bottom plate 24 and on its upper end by an upper plate 26 both of which are permanently fixed to the tubular member 20 by welding or other suitable means.

An inertia mass member 28 in the form of a solid metal rod is mounted in chamber 22. Plastic caps 30 are fitted on each end of rod 28 to lessen noise created by the rod's striking the inner surface of the tubular member 20 upon vibration of the tubular member 20 created by the pole vibration.

It should be noted that the inertia mass rod member 28 is not connected to the tubular member 20 in any manner and is capable of limited movement within chamber 22 due to the limited clearance between the outer surfaces of the rod and the end caps and the inner surface of the tubular member 20. Moreover, the tubular member 20 is mounted so that its longitudinal axis extends in a plane through which the longitudinal axis of the pole 12 also extends. The axis of member 20 and the longitudinal axis of the pole 12 are essentially parallel except for a small convergence created by the taper of the pole member 12. None of these features are thought to be critical in and of themselves; however, the resultant combination provides greatly enhanced vibration reducing characteristics that are achieved at a minimum cost.

FIG. 5 of the drawings illustrates a second embodiment of the invention mounted on the interior of a pole 12' by means 32 such as welding, extending inwardly through the pole wall for attaching the tubular member 20' to the inner wall of the pole 12'. The inertia rod mass 28 of this embodiment is identical to the inertia mass of the previous embodiment and in reality, the only difference between the two embodiments is the method of attachment to the pole. The embodiment of FIG. 5, while slightly more difficult to mount, is more aesthetic than the first embodiment in that the damping means does not interfere with the clean external lines of the pole and, in fact, is completely hidden from view.

While both embodiments of the invention have been shown permanently mounted within a tube 12 that is provided with top plates 26 welded to the top of the tube, it should be understood that the top plate 26 could be in the form of a removable cap or the like to permit installation of rods 28 of different weights in order to obtain optimum damping efficiency for any particular pole installation. These and other modifications will occur to those skilled in the art and it should be understood that this application merely illustrates preferred embodiments and the scope of the invention should be limited solely by the appended claims.

I claim:
1. The combination of an elongated pole member, attachment means for connecting a vibration damping means to said pole member, said vibration damping means including an elongated closed chamber defining member comprising a hollow tube, an unrestricted inertia mass member comprising a cylindrical rod member mounted in said hollow tube with the interior of said hollow tube providing limited clearance with respect to the outer surface of said rod member and relatively soft sound reducing caps on each end of said rod member whereby said cylindrical rod member is capable of limited movement in said hollow tube and serves to damp oscillations of said elongated pole member.

2. The invention of claim 1 wherein said hollow tube extends substantially parallel to said elongated pole member. claim 2 wherein said elongated pole member is of hollow tubular construction and said closed chamber defining member is mounted on the interior wall of said pole member.

4. The invention of claim 2 wherein said attachment means includes a collar extending about the exterior of said pole means.